US012140303B1

(12) United States Patent
Hou et al.

(10) Patent No.: US 12,140,303 B1
(45) Date of Patent: Nov. 12, 2024

(54) ADJUSTABLE LAMP WITH STRIP-SHAPED LIGHT SPOT

(71) Applicant: JIANGXI SUPERSUN TECHNOLOGY LIGHTING CO., LTD, Jiangxi (CN)

(72) Inventors: Mingxia Hou, Guangdong (CN); Lizhen Wang, Jiangxi (CN)

(73) Assignee: JIANGXI SUPERSUN TECHNOLOGY LIGHTING CO., LTD, Shangrao (CN)

( * ) Notice: Subject to any disclaimer, the term of this patent is extended or adjusted under 35 U.S.C. 154(b) by 0 days.

(21) Appl. No.: 18/395,732

(22) Filed: Dec. 25, 2023

(30) Foreign Application Priority Data

Sep. 12, 2023 (CN) ........................ 202322480375.X

(51) Int. Cl.
*F21V 5/04* (2006.01)
*F21V 5/00* (2018.01)
*F21V 5/08* (2006.01)
*F21V 21/30* (2006.01)
*F21Y 115/10* (2016.01)

(52) U.S. Cl.
CPC ................ *F21V 5/04* (2013.01); *F21V 5/007* (2013.01); *F21V 5/08* (2013.01); *F21V 21/30* (2013.01); *F21Y 2115/10* (2016.08)

(58) Field of Classification Search
CPC ... F21V 5/04; F21V 5/007; F21V 5/08; F21V 21/30
See application file for complete search history.

(56) References Cited

U.S. PATENT DOCUMENTS

| | | | | |
|---|---|---|---|---|
| 2013/0250575 A1* | 9/2013 | Wilcox | ................... | F21V 5/007 362/241 |
| 2016/0209010 A1* | 7/2016 | Wu | ......................... | F21V 21/28 |
| 2018/0209636 A1* | 7/2018 | Sohn | ....................... | F21V 21/30 |
| 2019/0120460 A1* | 4/2019 | Pelka | ......................... | F21V 5/04 |
| 2019/0368673 A1* | 12/2019 | Zhang | ....................... | F21V 5/04 |
| 2024/0175566 A1* | 5/2024 | Rapeanu | ................. | F21V 19/02 |

* cited by examiner

*Primary Examiner* — Tracie Y Green
*Assistant Examiner* — Michael Chiang
(74) *Attorney, Agent, or Firm* — Hemisphere Law, PLLC; Zhigang Ma

(57) ABSTRACT

The present application provides an adjustable lamp with a strip-shaped light spot, including: a lamp body, where a lamp panel is disposed in the lamp body; an optical lens, where the optical lens is fitted on the lamp panel and is fixedly connected to the lamp body; and an adjustment assembly, where the adjustment assembly is disposed on the lamp body; where when the lamp panel emits light, the light is projected by using the optical lens by changing the light into a strip-shaped light spot, and an angle of the lamp body is adjusted by using the adjustment assembly, so as to change a projection direction of the strip-shaped light spot.

4 Claims, 13 Drawing Sheets

ADJUSTABLE LAMP WITH STRIP-SHAPED LIGHT SPOT

CROSS REFERENCE TO RELATED APPLICATIONS

The present application claims the priority of Chinese Patent Application No. 202322480375.X filed on Sep. 12, 2023, the contents of which are incorporated herein by reference in its entirety.

TECHNICAL FIELD

The present application relates to the field of lighting technologies, and in particular, to an adjustable lamp with a strip-shaped light spot.

BACKGROUND

In most scenarios, lamps are applied according to a conventional habit solution. Each type of product has a unique application site. In locations such as a factory and a warehouse, some aisle areas exist, and most aisles are distributed in regular rectangles. In terms of lighting, a main lighting area in a warehouse scenario is an aisle. Generally, a lighting design generally uses a strip-shaped lighting product that has a strip-shaped light spot output. A rectangular light spot has a relatively high shape adaptation degree for the aisle, and lighting utilization is also relatively good. However, because a strip-shaped lamp generally has a large body size, a composition of the lamp needs to consume more materials, and consequently, application costs are high.

Therefore, a new type of round lamp is favored by many clients because of its small size and low costs. In addition, many clients have used round lamps for replacement. However, only round lamps with a round light spot are available in the market at present. As a result, replacement of a strip-shaped lamp by a round lamp cannot fully play its role. Because a round light spot is used for projection, ground illumination tends to generate an intersection dark area, and density of lamps needs to be increased to reduce the dark area, resulting in low lighting utilization. In addition, traditional round lamps are basically suspended during mounting. Suspended mounting may easily cause horizontal rotation of the lamps, easily causing deviation of a projection area of the light spot and difficulty in positioning.

Therefore, the conventional technology has disadvantages, and further improvement is required.

SUMMARY

To resolve the problem existing in the conventional technology, the present application provides an adjustable lamp with a strip-shaped light spot.

To achieve the foregoing objective, a specific solution of the present application is as follows:

The present application provides an adjustable lamp with a strip-shaped light spot, including:

a lamp body, wherein a lamp panel is disposed in the lamp body;

an optical lens, wherein the optical lens is fitted on the lamp panel and is fixedly connected to the lamp body; and an adjustment assembly, wherein the adjustment assembly is disposed on the lamp body;

wherein when the lamp panel emits light, the light is projected by using the optical lens by changing the light into a strip-shaped light spot, and an angle of the lamp body is adjusted by using the adjustment assembly, so as to change a projection direction of the strip-shaped light spot.

Further, the optical lens includes several split-type single-particle lenses.

Further, wherein an overall shape of the split-type single-particle lens is circular, square, rectangular, or irregular.

Further, wherein LED lamp beads on the lamp panel are disposed in a one-to-one correspondence with the split-type single-particle lenses.

Further, wherein the optical lens comprises several continuous strip-shaped lenses.

Further, wherein an overall structure of the continuous strip-shaped lens is set to be circular, square, rectangular, or irregular.

Further, wherein a plurality of LED lamp beads are disposed on the lamp panel to form light bars, and the plurality of LED light bars are disposed in correspondence with the several continuous strip-shaped lenses.

Further, wherein the adjustment assembly comprises:

an adjustment member, wherein both ends of the adjustment member are provided with a plurality of angle adjustment holes and positioning holes, and a middle end of the adjustment member is provided with a first fixing hole; and a mounting member, wherein both ends of the mounting member are provided with a second fixing hole in correspondence with the positioning hole, and a middle end of the mounting member is provided with a mounting hole;

wherein both ends of the adjustment member and both ends of the mounting member are movably connected to the lamp body by using the positioning holes and the second fixing holes, the middle end of the adjustment member is fixedly connected to the lamp body by using the first fixing hole, and the adjustment member is fixedly connected to the lamp body by selecting a different adjustment hole to adjust an angle of the lamp body.

Further, wherein the adjustment assembly comprises: the adjustment member is provided with rotating screws in correspondence with the adjustment hole and the positioning hole; the rotating screws are correspondingly provided with rotating nuts; and the adjustment member is provided with an axial screw in correspondence with the first fixing hole.

Further, wherein the split-type single-particle lens comprises an in-lens curved surface and an out-of-lens curved surface; and a first optical path control area and a second optical path control area are disposed between the in-lens curved surface and the out-of-lens curved surface.

The technical solution of the present application has the following beneficial effects:

In the present application, when the lamp panel emits light, the light is projected by using the optical lens by changing the light into a strip-shaped light spot, and an angle of the lamp body is adjusted by using the adjustment assembly, so as to change a projection direction of the strip-shaped light spot. In this design manner, not only projection of a strip-shaped light spot is implemented, but also a projection direction of the strip-shaped light spot is changed by using the adjustment assembly, so that the light spot of the lamp can be projected in any direction, and a biased mounting manner with an adjustable light spot projection position is implemented, thereby bringing better adaptation and adjustment to a scenario application.

DESCRIPTION OF EMBODIMENTS

The following further describes the present application in detail with reference to the accompanying drawings and embodiments. It may be understood that the specific embodiments described herein are merely intended for explaining the present application, but not for limiting the present application. In addition, it should be further noted that, for ease of description, the accompanying drawings show only some but not all structures related to the present application.

In the description of the present application, unless otherwise specified and defined, terms such as "connected", "connect", and "fix" should be broadly understood, for example, may be understood as a fixed connection, a detachable connection, or an integer, may be understood as a mechanical connection, or an electrical connection, or may be understood as a direct connection, an indirect connection implemented by using an intermediate medium, an internal connection between two components, or an interaction relationship between two components. For a person of ordinary skill in the art, specific meanings of the foregoing terms in the present application may be understood according to a specific situation.

In the present application, unless otherwise specified and limited, that a first feature is "above" or "under" a second feature may include that the first feature and the second feature are in direct contact, or may include that the first feature and the second feature are in contact by using another feature between them instead of being in direct contact. In addition, that the first feature is "above", "on top of", and "over" the second feature includes that the first feature is directly above and obliquely above the second feature, or merely indicates that the first feature is at a higher level than the second feature. That the first feature is "below", "under", and "beneath" the second feature includes that the first feature is directly below and obliquely below the second feature, or merely indicates that the first feature is at a lower level than the second feature.

In the description of embodiments, an orientation or positional relationship indicated by terms "upper", "lower", "front", "rear", "left", "right", and the like, is based on the orientation or positional relationship shown in accompanying drawings, and is only for ease of describing and simplifying operations, rather than indicating or implying that an apparatus or a component referred to must have a specific orientation, be constructed and operated in a specific orientation, which therefore cannot be understood as a limitation to the present application. In addition, the terms "first" and "second" are merely used for differentiation in description, and have no special meaning.

Figure 1:
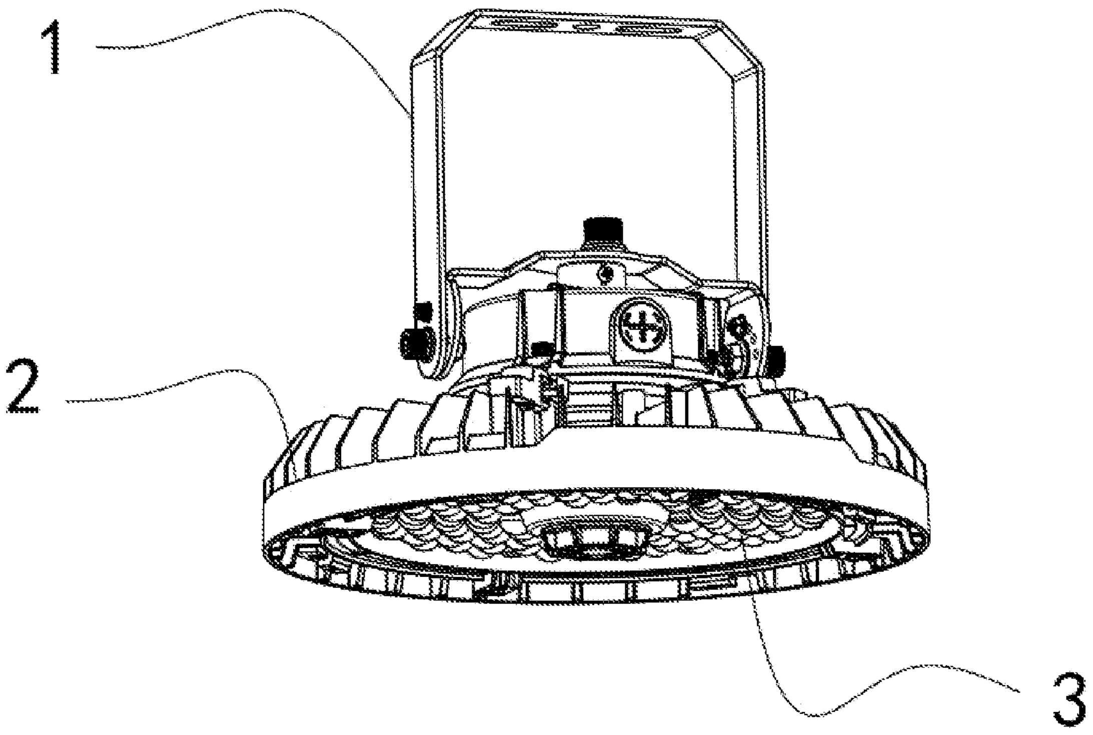
FIG. 1 is a three-dimensional diagram of the present application.
Figure 2:
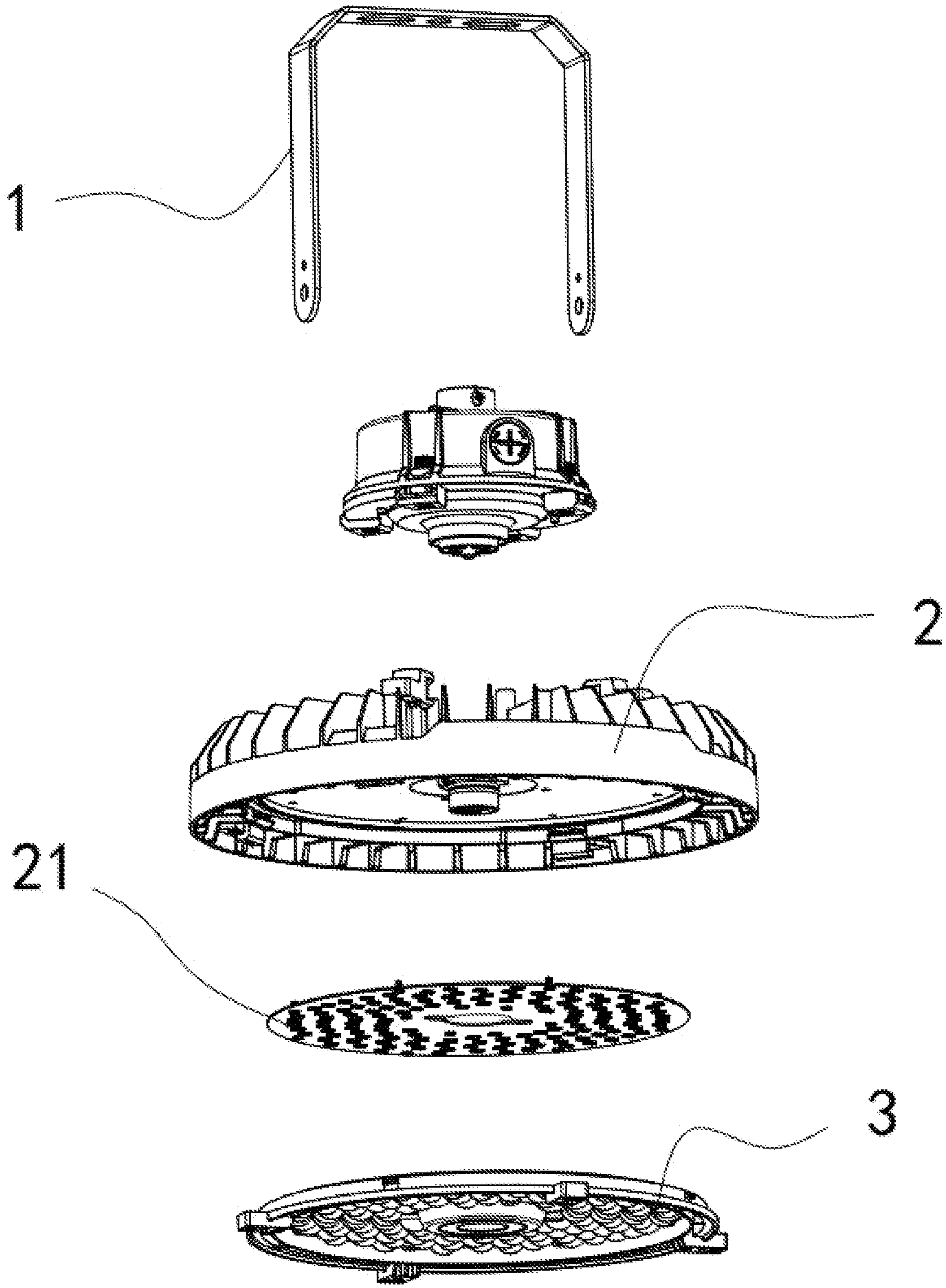
FIG. 2 is an exploded diagram of the present application.
Figure 3:
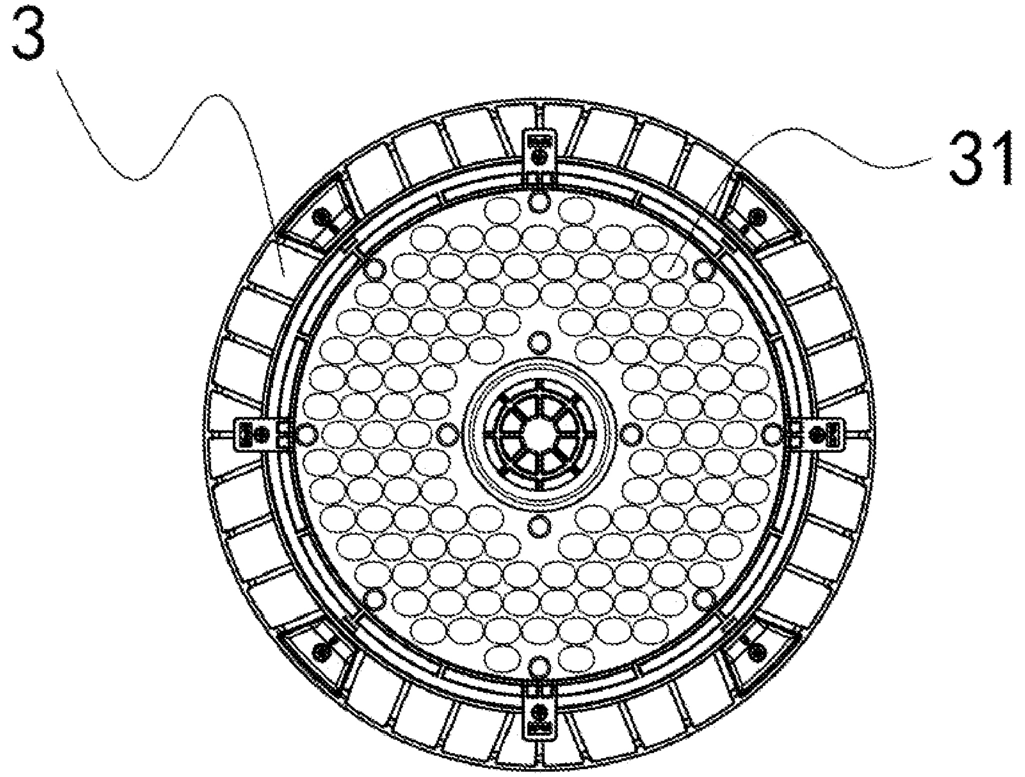
FIG. 3 is a schematic structural diagram in which an optical lens is several split-type single-particle lenses according to the present application.

As shown in FIG. 1 to FIG. 3, the present application provides an adjustable lamp with a strip-shaped light spot, including:

- a lamp body 2, where a lamp panel 21 is disposed in the lamp body 2;
- an optical lens 3, where the optical lens 3 is fitted on the lamp panel 21 and is fixedly connected to the lamp body 2; and
- an adjustment assembly 1, where the adjustment assembly 1 is disposed on the lamp body 2;
- where when the lamp panel 21 emits light, the light is projected by using the optical lens 3 by changing the light into a strip-shaped light spot, and an angle of the lamp body 2 is adjusted by using the adjustment assembly 1, so as to change a projection direction of the strip-shaped light spot.

Referring to FIG. 3, FIG. 7, FIG. 11, FIG. 12, and FIG. 13, in this embodiment, the optical lens 3 includes several split-type single-particle lenses 31, and LED lamp beads 211 on the lamp panel 21 are disposed in a one-to-one correspondence with the split-type single-particle lenses 31.

Alternatively, the lens of the split-type single-particle lens 31 may use a plurality of available design manners, such as an internal cup shape, an external cup shape, total reflection, semi-reflection, and a periscope. The light spot is not limited to a strip-shaped light spot. The light spot of the split-type single-particle lens 31 may alternatively be designed to have various light shapes, such as a square shape, a circle shape, or a special shape. The split-type single-particle lens 31 in this embodiment uses an elliptical structure to form a strip-shaped light spot.

Figure 4:
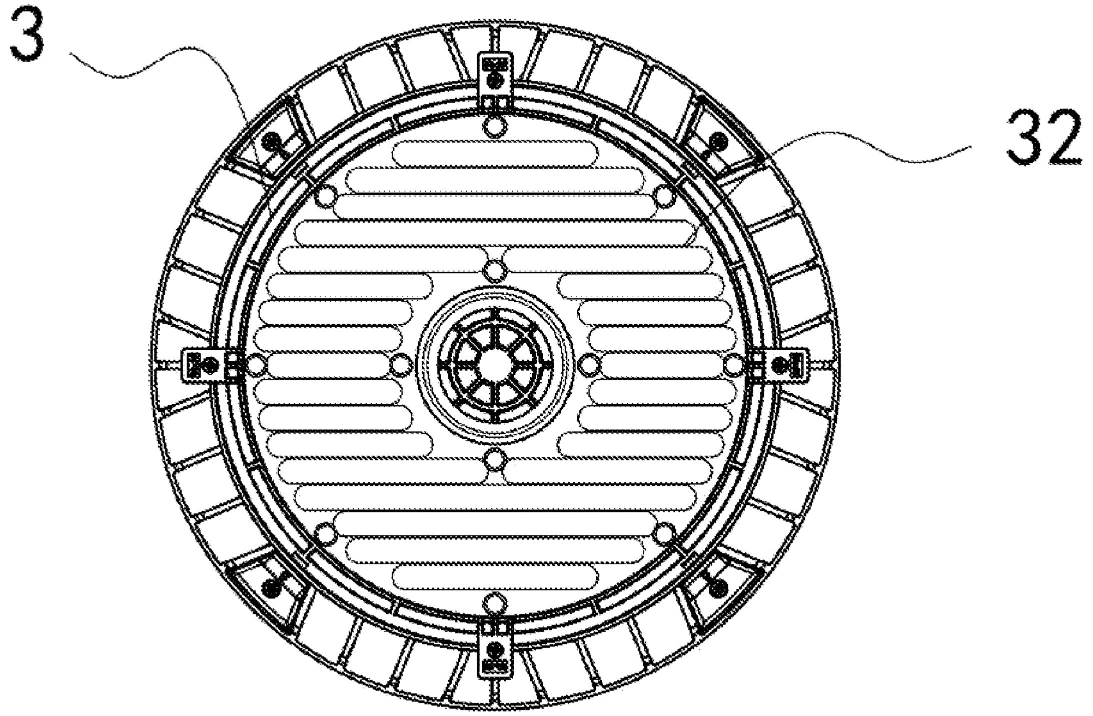
FIG. 4 is a schematic structural diagram in which an optical lens is several continuous strip-shaped lenses according to the present application.
Figure 8:
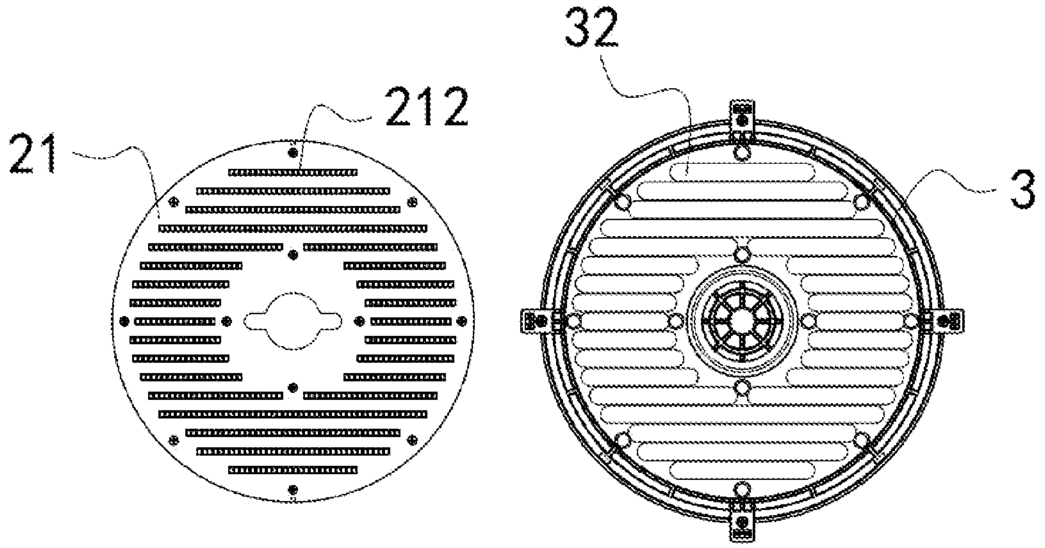
FIG. 8 is a schematic diagram of a correspondence between a continuous strip-shaped lens and a lamp panel according to the present application.

Referring to FIG. 4 and FIG. 8, in this embodiment, the optical lens 3 may alternatively use several continuous strip-shaped lenses 32, a plurality of LED lamp beads are disposed on the lamp panel 21 to form light bars 212, and the plurality of LED light bars 212 are disposed in correspondence with the several continuous strip-shaped lenses 32.

A quantity of LED lamp beads is set according to a length of the LED light bar 212 and the strip-shaped lens 32. The LED lamp beads may be arranged at any spacing within the strip-shaped lens 32, and density of distributable LED lamp beads is also higher. Although its light control accuracy is slightly lower than that of a single-particle lens, its characteristic of high density distribution is more suitable for higher brightness products.

Figure 5:
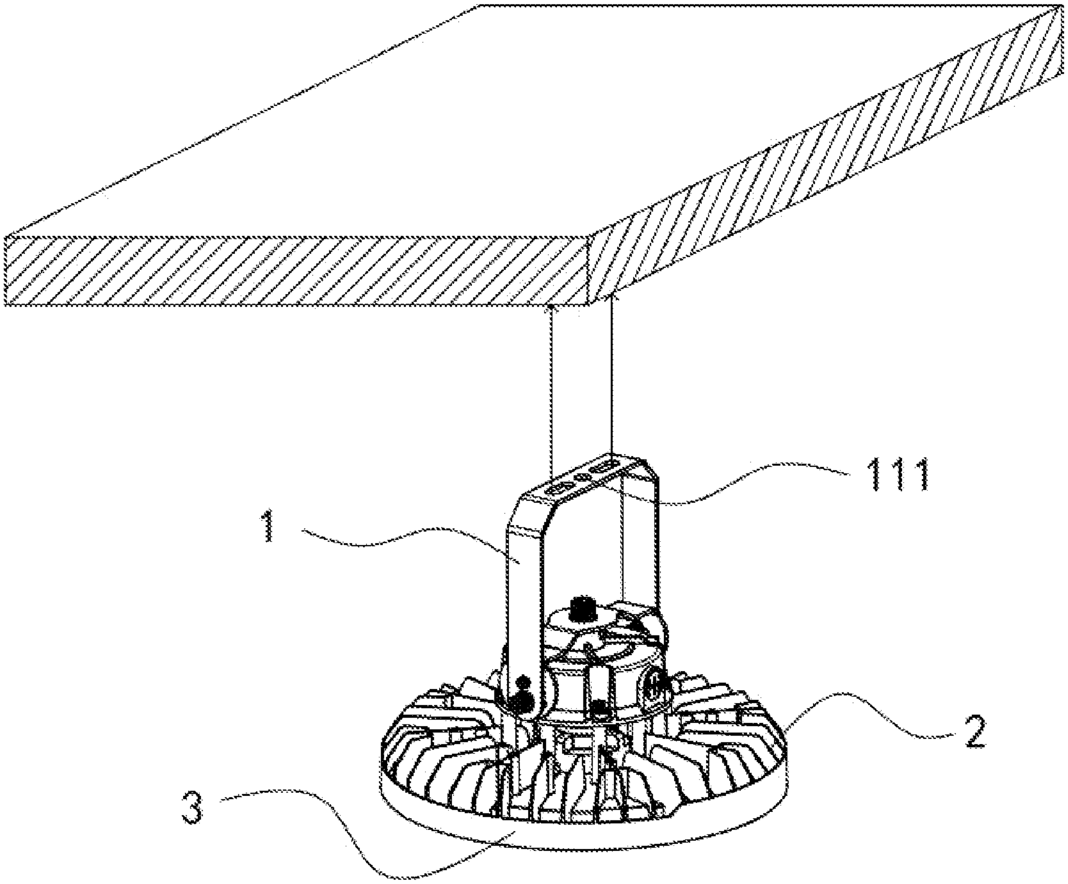
FIG. 5 is a schematic structural diagram of a lamp mounted on a ceiling according to the present application.
Figure 6:
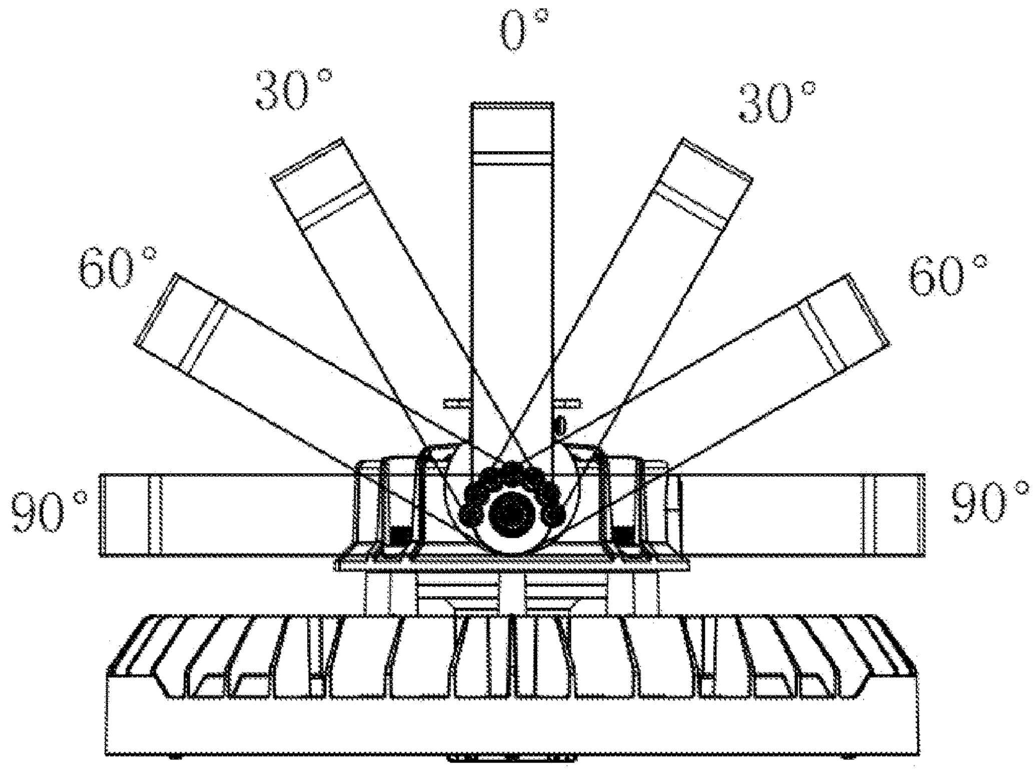
FIG. 6 is a schematic structural diagram of a lamp rotation angle according to the present application.
Figure 7:
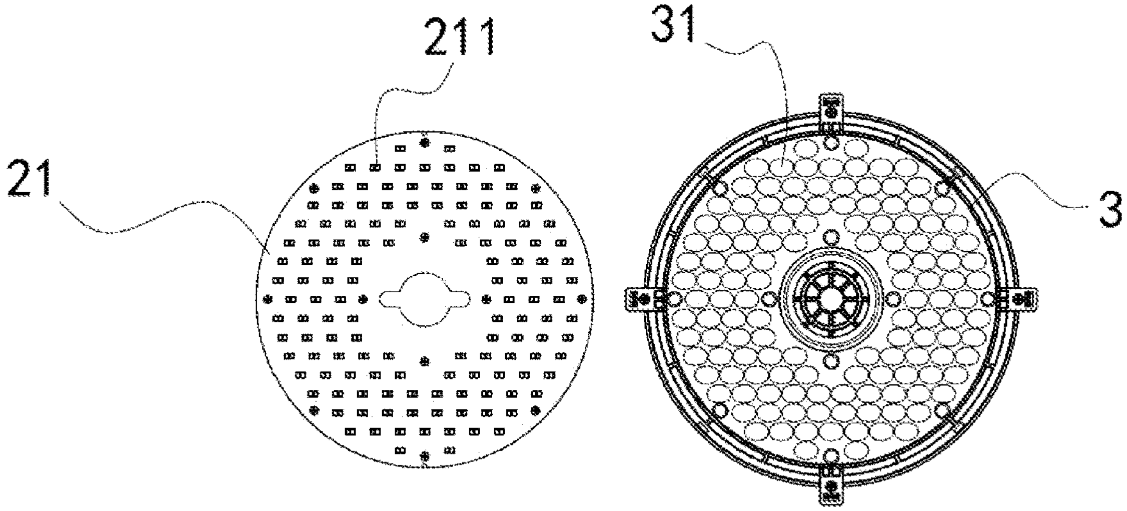
FIG. 7 is a schematic diagram of a correspondence between a split-type single-particle lens and a lamp panel according to the present application.
Figure 9:
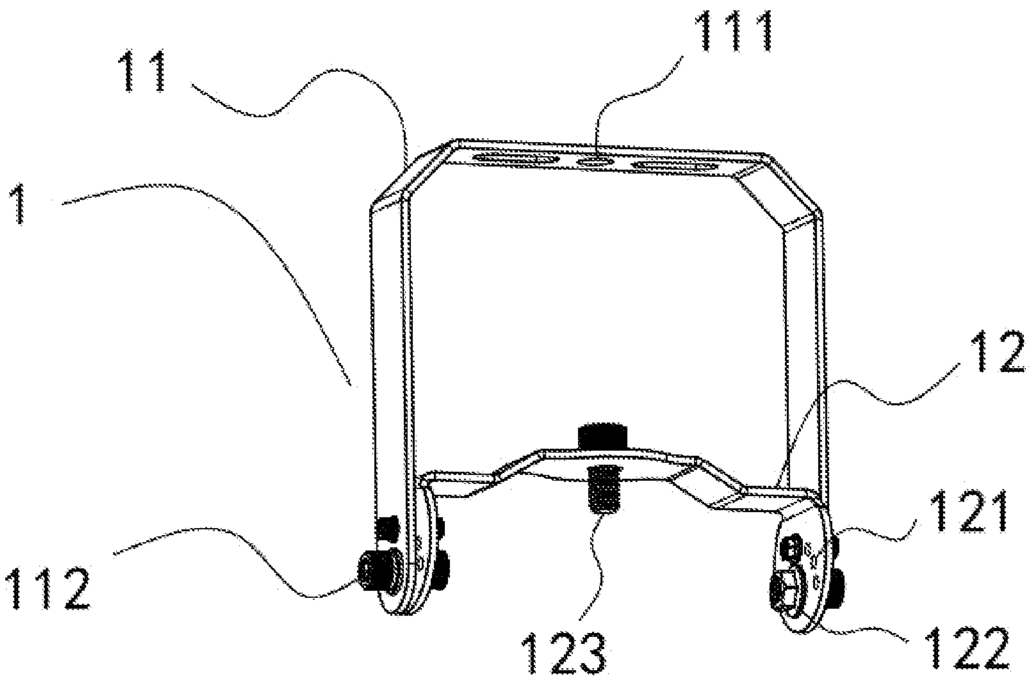
FIG. 9 is a schematic structural diagram of an adjustment assembly according to the present application.
Figure 10:
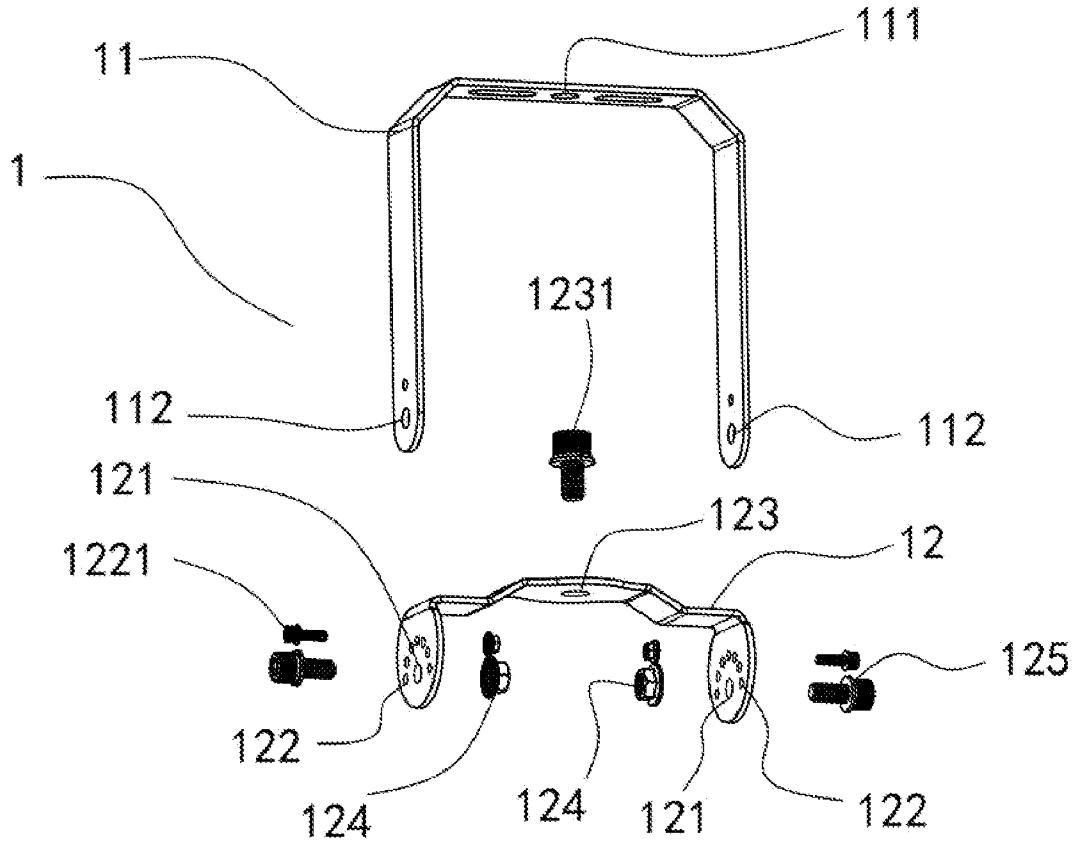
FIG. 10 is a schematic structural exploded diagram of an adjustment assembly according to the present application.

Referring to FIG. 5, FIG. 6, and FIG. 9, in this embodiment, the adjustment assembly 1 includes:

- an adjustment member 12, where both ends of the adjustment member 12 are provided with a plurality of angle adjustment holes 121 and positioning holes 122, and a middle end of the adjustment member 12 is provided with a first fixing hole 123; and
- a mounting member 11, where both ends of the mounting member 11 are provided with a second fixing hole 112 in correspondence with the positioning hole 122, and a middle end of the mounting member 11 is provided with a mounting hole 111;
- where both ends of the adjustment member 12 and both ends of the mounting member 11 are movably connected to the lamp body 2 by using the positioning holes 122 and the second fixing holes 112, the middle end of the adjustment member 12 is fixedly connected to the lamp body 2 by using the first fixing hole 123, and the adjustment member 12 is fixedly connected to the lamp body 2 by selecting a different adjustment hole 121 to adjust an angle of the lamp body 2. In addition, the adjustment assembly 1 may be fixed to a wall through the mounting hole 111 by using a screw.

Referring to FIG. 5, FIG. 6, FIG. 9, and FIG. 10, in this embodiment, the adjustment member 12 is provided with rotating screws 125 in correspondence with the adjustment hole 121 and the positioning hole 122; the rotating screws 125 are correspondingly provided with rotating nuts 124; and the adjustment member 12 is provided with an axial screw 1231 in correspondence with the first fixing hole 123.

Figure 14:
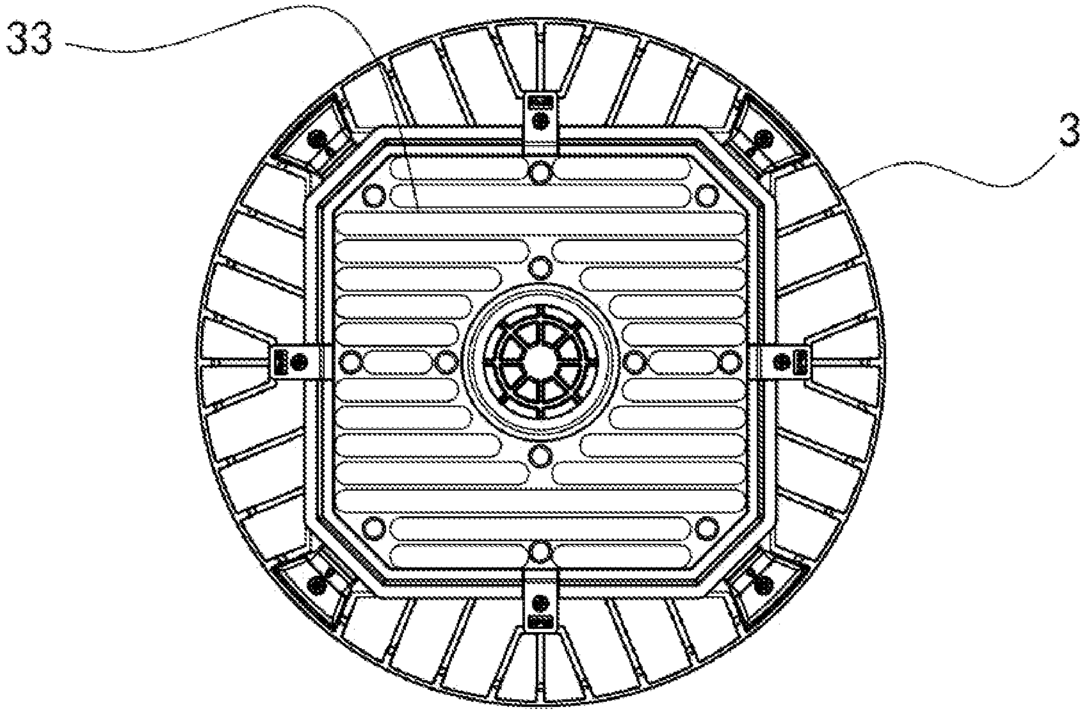
FIG. 14 is a schematic structural diagram in which an overall structure of several continuous strip-shaped lenses is square according to the present application.
Figure 15:
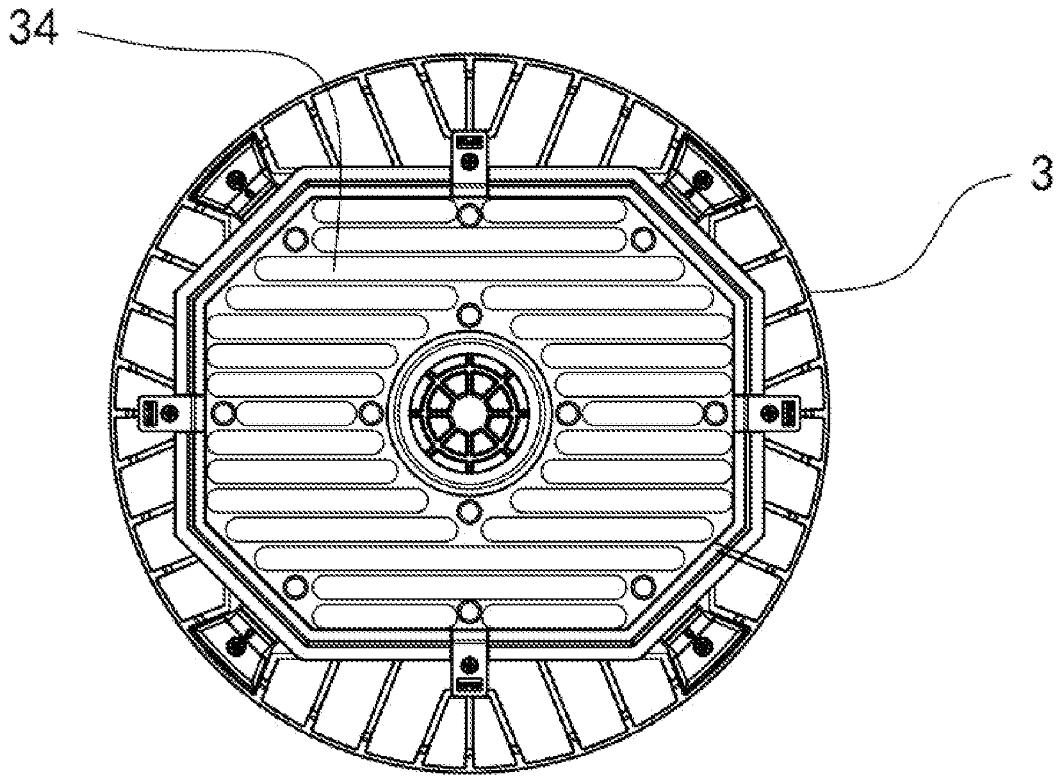
FIG. 15 is a schematic structural diagram in which an overall structure of several continuous strip-shaped lenses is rectangular according to the present application.

Referring to FIG. 14 and FIG. 15, in this embodiment, an overall structure of the several continuous strip-shaped lenses is set to a circle (as shown in FIG. 8), the overall structure of the several continuous strip-shaped lenses is set to a square (as shown in FIG. 14), and the overall structure of the several continuous strip-shaped lenses is set to a rectangle (as shown in FIG. 15). The overall structure of the several continuous strip-shaped lenses may be further set to a special shape as required.

In FIG. 14, the optical lens 3 includes several continuous strip-shaped lenses 33. In FIG. 15, the optical lens 3 includes several continuous strip-shaped lenses 34.

Figure 11:
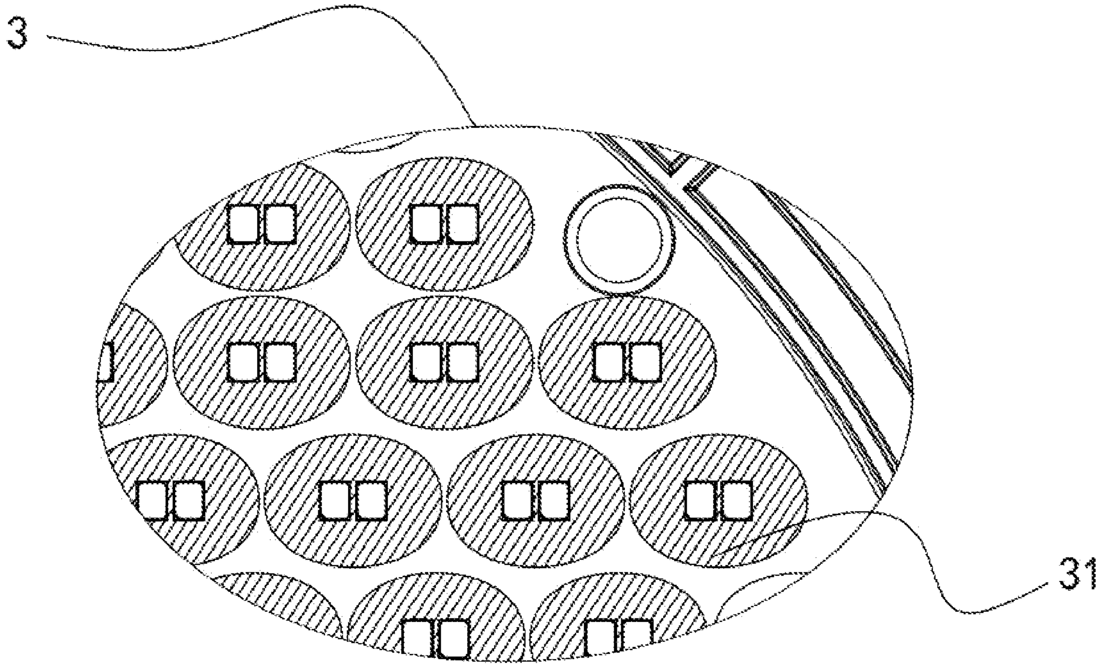
FIG. 11 is a partial schematic diagram of FIG. 3 according to the present application.
Figure 12:
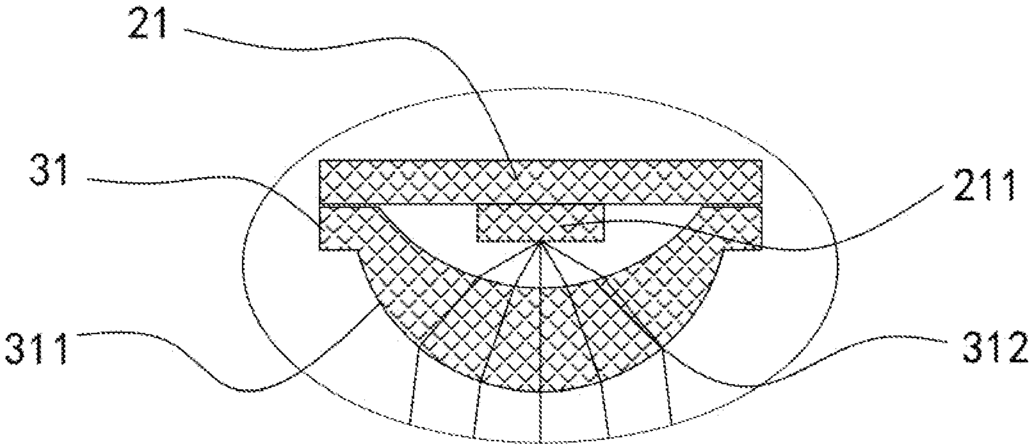
FIG. 12 is a schematic diagram of a single-particle refraction optical path of a split-type single-particle lens according to the present application.
Figure 13:
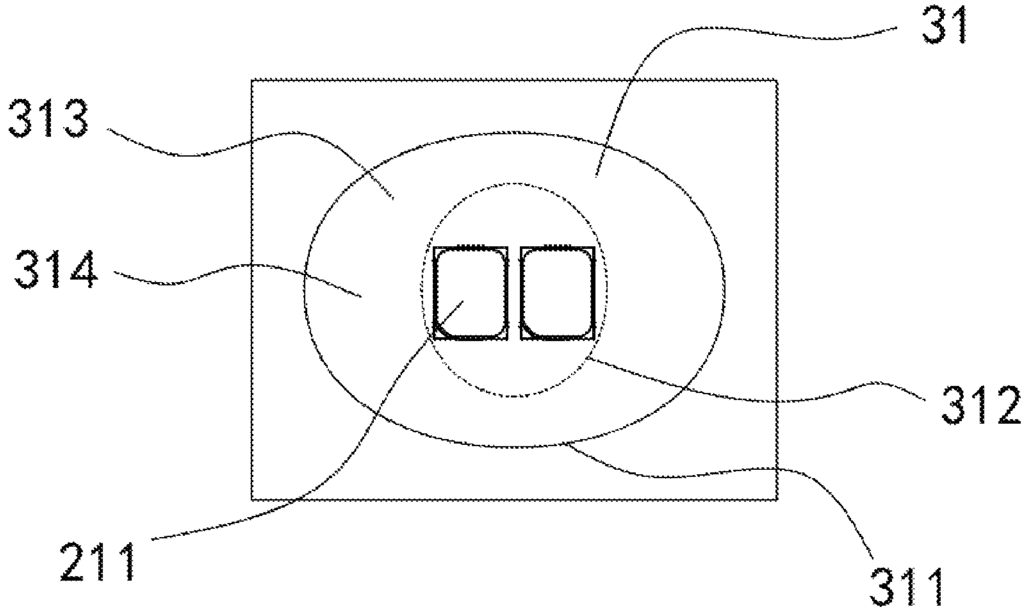
FIG. 13 is a schematic structural diagram of a single split-type single-particle lens and an LED lamp according to the present application.

As shown in FIG. 11 to FIG. 13, in this embodiment, the split-type single-particle lens 31 includes an in-lens curved surface 312 and an out-of-lens curved surface 311; and a first optical path control area 313 and a second optical path control area 314 are disposed between the in-lens curved surface 312 and the out-of-lens curved surface 311, where the first optical path control area 313 is in a typical position in a vertical direction, and the second optical path control area 314 is in a typical position in a horizontal direction.

The LED lamp bead 211 on the lamp panel 21 is disposed in the in-lens curved surface 312. When the LED lamp bead 211 emits a light source, the light source is refracted by using the first optical path control area 313 and the second optical path control area 314, so that an illumination angle of the original light source is changed through refraction. Because the first optical path control area 313 and the second optical path control area 314 are provided with unequal control parameters, light outputs at different angles are generated in a horizontal direction and a vertical direction, and vertical and horizontal angles are not equal, so that the light spot is in a strip shape, thereby implementing adjustment of the light spot.

The foregoing describes merely preferred embodiments of the present application, but are not intended to limit the patent scope of the present application. Under the concept of the present application, all equivalent structure changes made by using the content of the specification and the accompanying drawings of the present application, or direct/indirect application thereof in another related technical field are included in the protection scope of the present application.

What is claimed is:

1. An adjustable lamp with a strip-shaped light spot, comprising:

- a lamp body, wherein a lamp panel is disposed in the lamp body;
- an optical lens, wherein the optical lens is fitted on the lamp panel and is fixedly connected to the lamp body; and
- an adjustment assembly, wherein the adjustment assembly is disposed on the lamp body;
- wherein when the lamp panel emits light, the light is projected by using the optical lens by changing the light into a strip-shaped light spot, and an angle of the lamp body is adjusted by using the adjustment assembly, so as to change a projection direction of the strip-shaped light spot; and wherein
- the optical lens comprises several split-type single-particle lenses; and wherein
- LED lamp beads on the lamp panel are disposed in a one-to-one correspondence with the split-type single-particle lenses; and wherein
- the split-type single-particle lens comprises an in-lens curved surface and an out-of-lens curved surface, and a first optical path control area and a second optical path control area are disposed between the in-lens curved surface and the out-of-lens curved surface, the first optical path control area formed in a vertical direction and the second optical path control area formed in a horizontal direction; and wherein
- the LED lamp beads on the lamp panel are disposed in the in-lens curved surface, and when a light source is emitted from the LED lamp beads and then refracted by the first optical path control area and the second optical path control area, so that an illumination angle of the original light source is changed through refraction; wherein the first optical path control area and the second optical path control area are provided with unequal control parameters, and light output at different angles are generated in the horizontal direction and the vertical direction, and vertical and horizontal angles are unequal, so that the light spot is adjusted in a strip-shape.

2. The adjustable lamp with a strip-shaped light spot according to claim 1, wherein an overall shape of the split-type single-particle lens is circular, square, rectangular, or irregular.

3. The adjustable lamp with a strip-shaped light spot according to claim 1, wherein the adjustment assembly comprises:

- an adjustment member, wherein both ends of the adjustment member are provided with a plurality of angle adjustment holes and positioning holes, and a middle end of the adjustment member is provided with a first fixing hole; and a mounting member, wherein both ends of the mounting member are provided with a second fixing hole in correspondence with the positioning hole, and a middle end of the mounting member is provided with a mounting hole;

wherein both ends of the adjustment member and both ends of the mounting member are movably connected to the lamp body by using the positioning holes and the second fixing holes, the middle end of the adjustment member is fixedly connected to the lamp body by using the first fixing hole, and the adjustment member is fixedly connected to the lamp body by selecting a different adjustment hole to adjust an angle of the lamp body.

4. The adjustable lamp with a strip-shaped light spot according to claim 3, wherein the adjustment assembly comprises: the adjustment member is provided with rotating screws in correspondence with the adjustment hole and the positioning hole; the rotating screws are correspondingly provided with rotating nuts; and the adjustment member is provided with an axial screw in correspondence with the first fixing hole.

* * * * *